United States Patent [19]
Fukasawa et al.

[11] Patent Number: 5,180,453
[45] Date of Patent: Jan. 19, 1993

[54] HEAVY DUTY PNEUMATIC TIRES

[75] Inventors: Fumiaki Fukasawa; Hiromichi Ikeda, both of Tokyo, Japan

[73] Assignee: Bridgestone Corporation, Tokyo, Japan

[21] Appl. No.: 497,033

[22] Filed: Mar. 20, 1990

[30] Foreign Application Priority Data

Mar. 24, 1989 [JP] Japan .................................. 1-70422
Nov. 21, 1989 [JP] Japan ................................ 1-300662

[51] Int. Cl.⁵ .............................................. B60C 11/08
[52] U.S. Cl. ............................ 152/209 R; 152/209 B
[58] Field of Search ....... 152/209 R, 209 B, 209 WT, 152/209 D

[56] References Cited

U.S. PATENT DOCUMENTS

| | | | |
|---|---|---|---|
| 2,260,193 | 10/1941 | Overman | 152/209 R |
| 2,604,920 | 7/1952 | Kirby | 152/209 R |
| 4,412,575 | 11/1983 | Maeda et al. | 152/209 B |
| 4,445,561 | 5/1984 | Kono et al. | 152/209 B |
| 4,945,966 | 8/1990 | Ogawa | 152/209 R |

FOREIGN PATENT DOCUMENTS

| | | | |
|---|---|---|---|
| 0313361 | 4/1989 | European Pat. Off. | 152/209 R |
| 0755137 | 8/1956 | United Kingdom | 152/209 R |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

In a heavy duty pneumatic tire having a lug pattern and used for truck, bus, construction vehicle and the like, at least two lug grooves located in each half region of the tread portion are connected to each other through an auxiliary groove containing a step protrusion therein, and the widths and depths of the auxiliary groove and step protrusion satisfy particular relationships.

9 Claims, 14 Drawing Sheets

FIG_1a
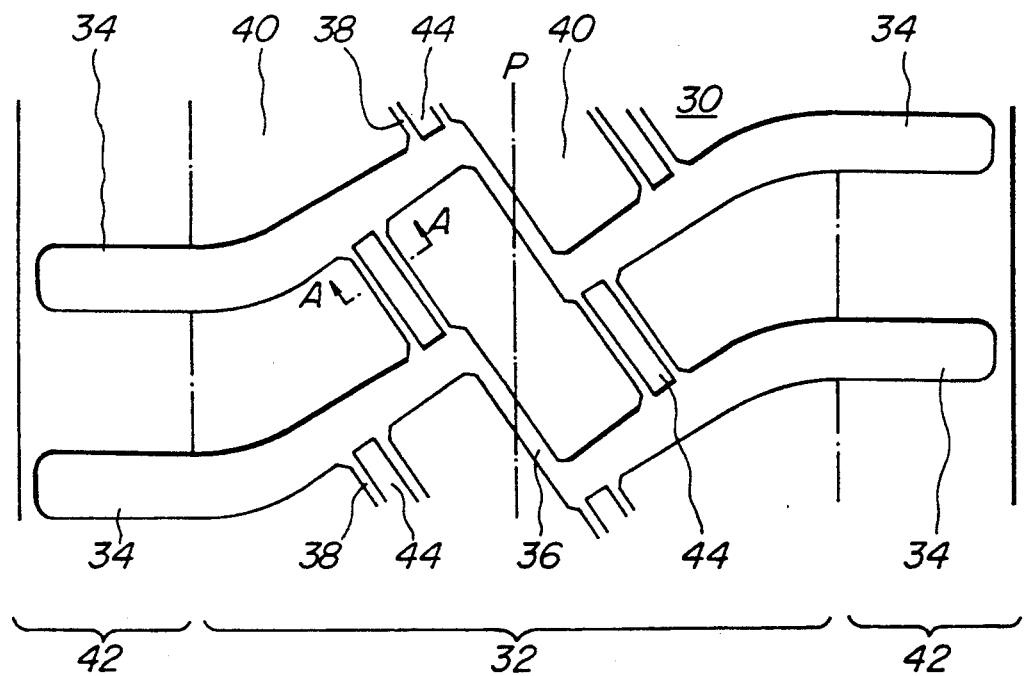
FIG_1b
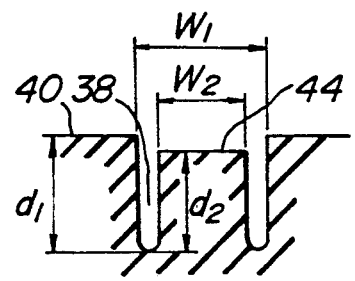

FIG_3a
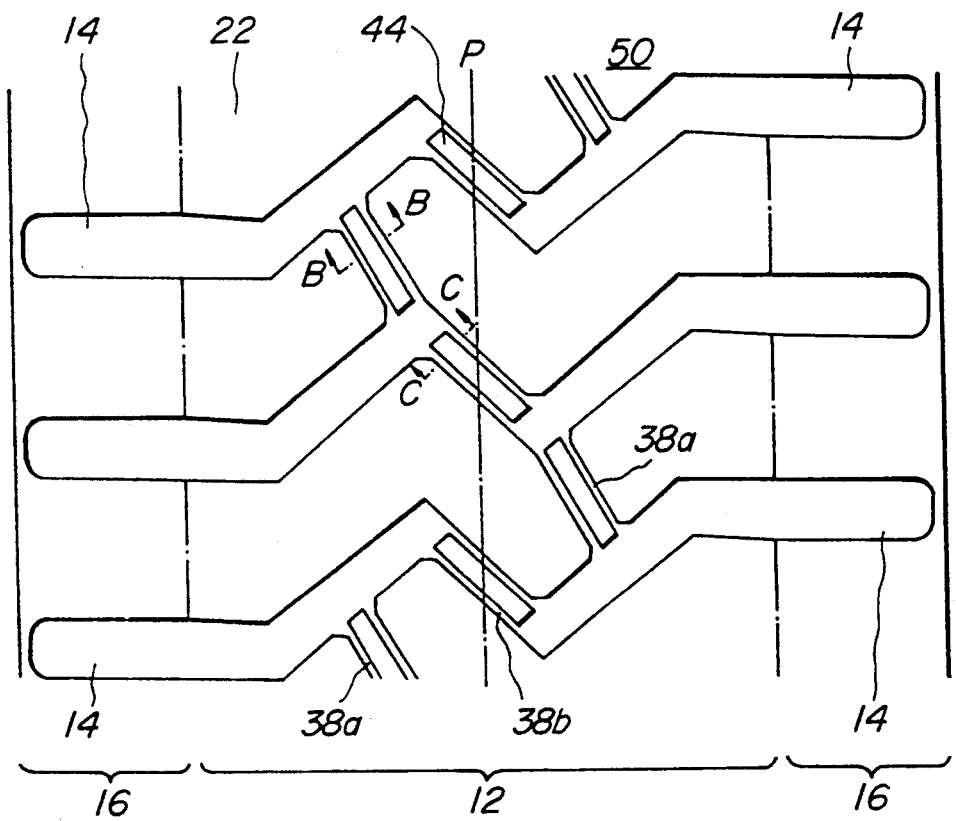
FIG_3b
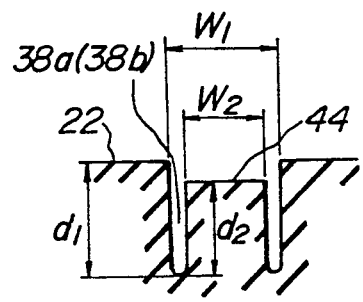

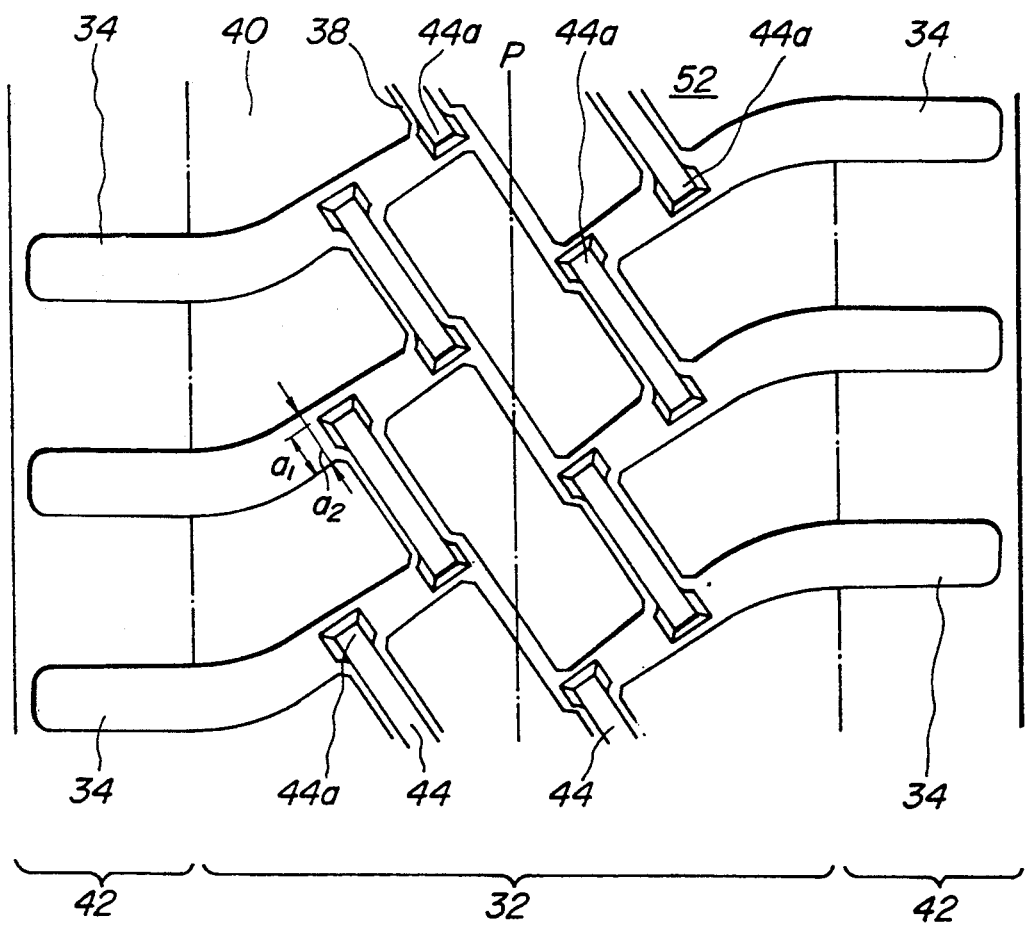
FIG_4

FIG_8

FIG_11a
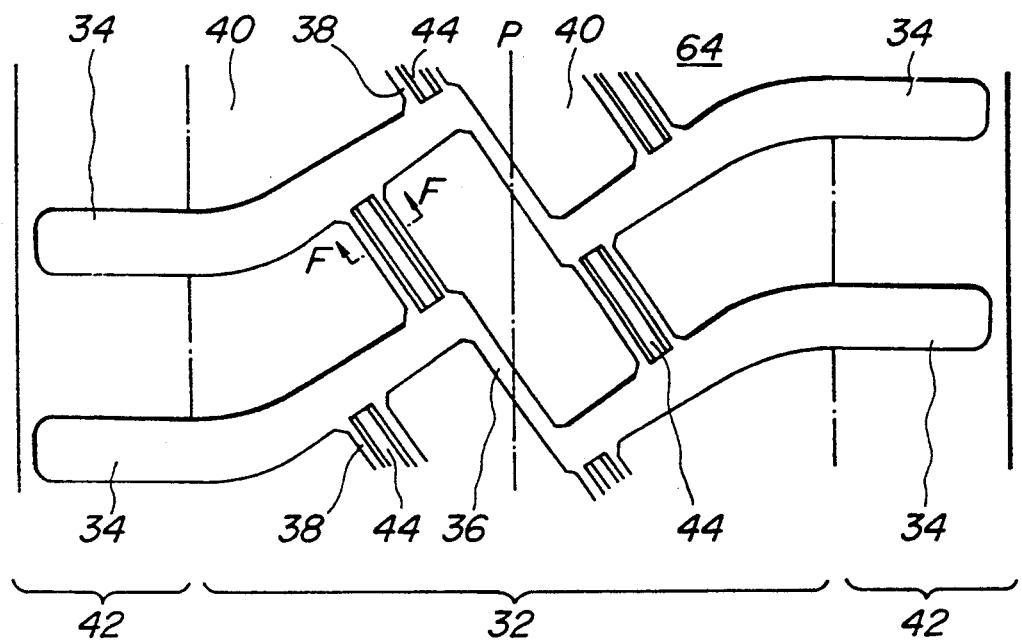
FIG_11b
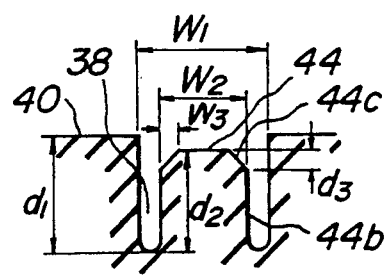

FIG_12
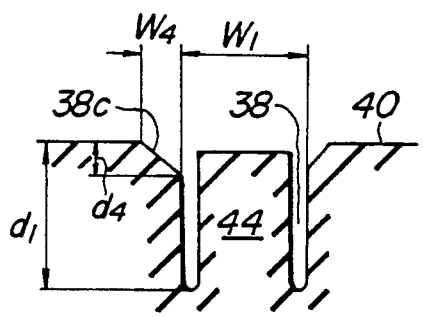
FIG_13a
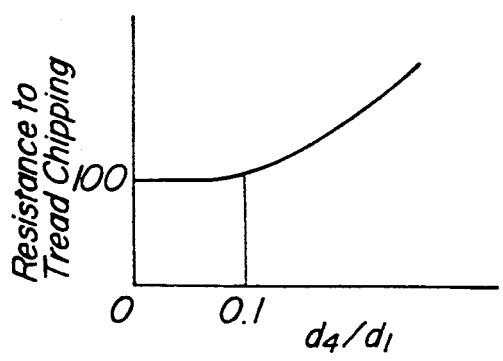
FIG_13c
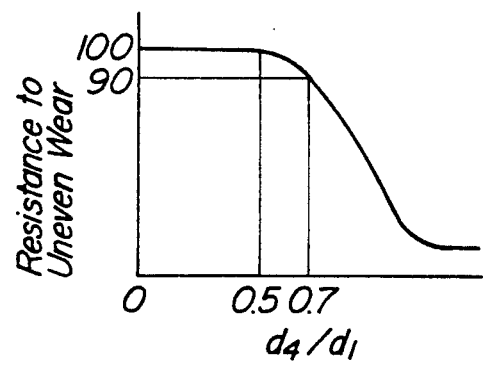
FIG_13b
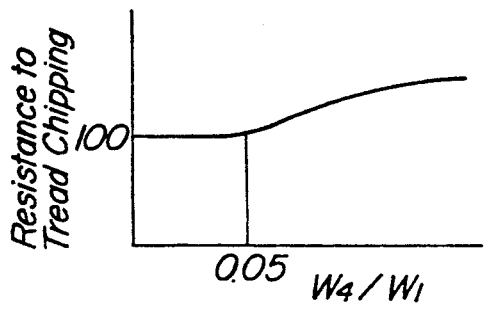
FIG_13d
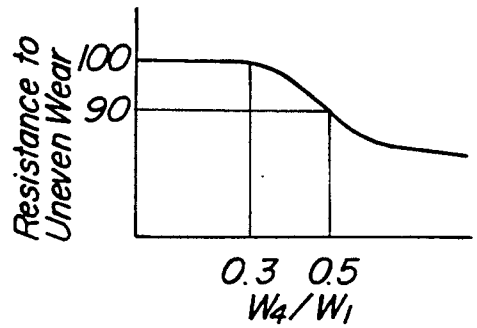

FIG_14a
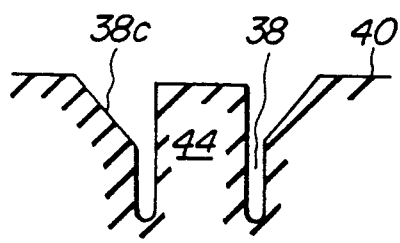
FIG_14b
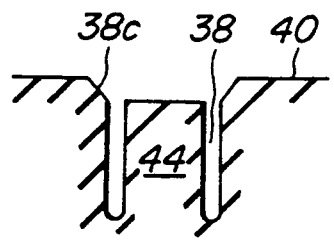
FIG_15a
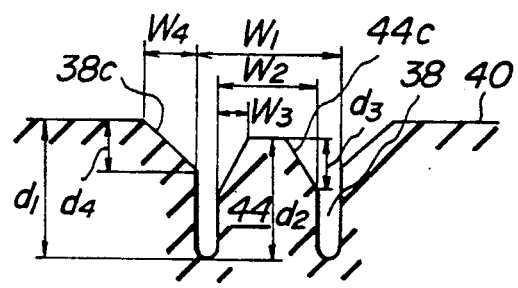
FIG_15b
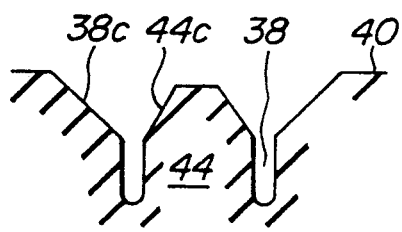
FIG_15c
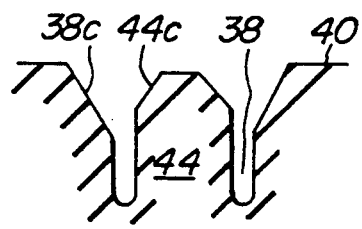

FIG_16a
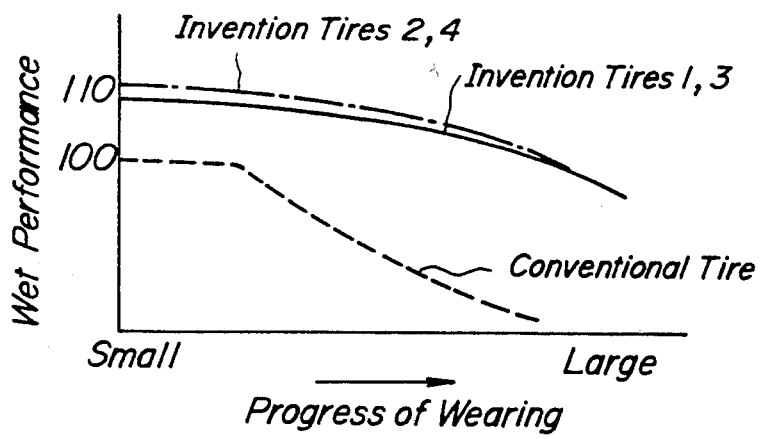
FIG_16b
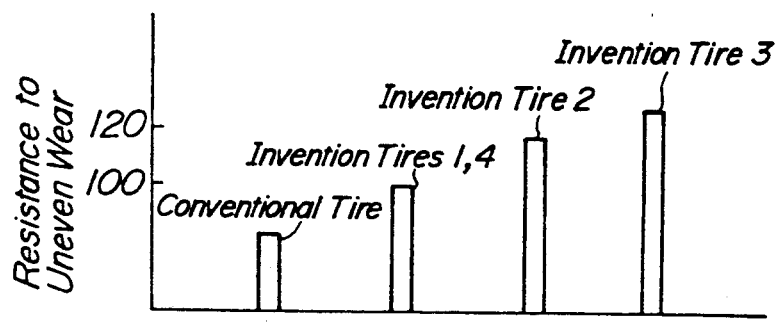
FIG_16c
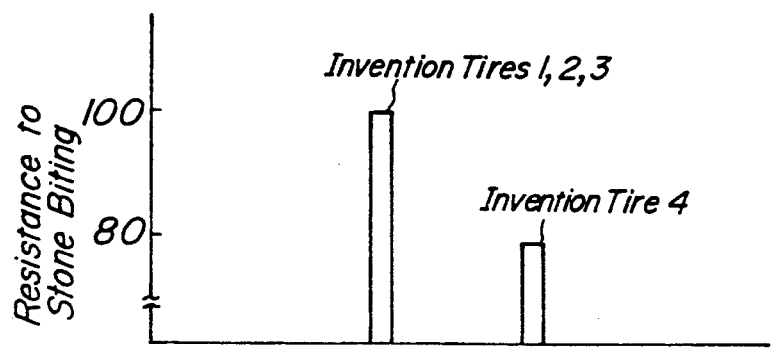

FIG_17a
PRIOR ART
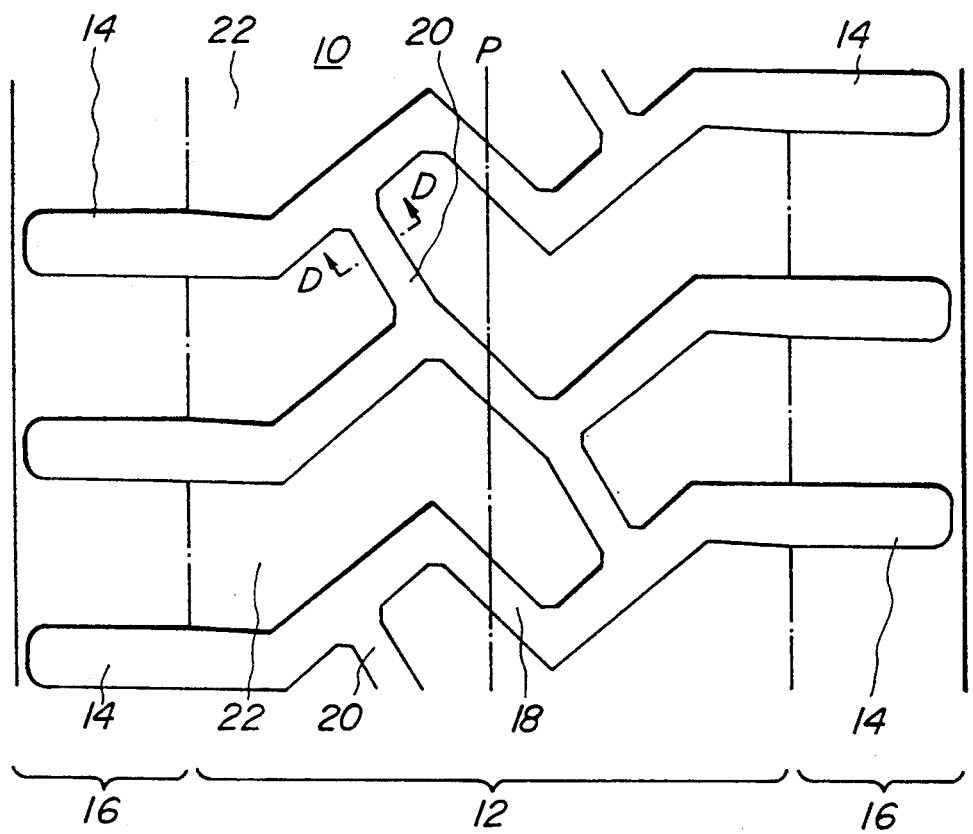
FIG_17b
PRIOR ART
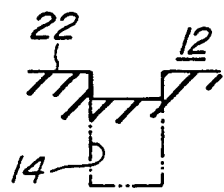

HEAVY DUTY PNEUMATIC TIRES

BACKGROUND OF THE INVENTION

1. Field of the Invention

This invention relates to heavy duty pneumatic tires, and more particularly to a heavy duty pneumatic tire having improved traction and braking performances on a wet road surface or wet performances without damaging resistance to uneven wear and resistance to stone biting.

2. Related Art Statement

In the pneumatic tire having lug grooves separated from each other in the circumferential direction of the tire and extending substantially in the widthwise direction of the tire and island portions defined by such lug grooves or a lug pattern, traction force and braking force are excellent. Such tires are widely used as a tire for truck and bus, a tire for a construction vehicle and the like.

On the other hand, there is a chance of a truck, bus and the like provided with such a tire running at a high speed according to road conditions, hence, it is highly demanded to have steering property and stability in such tires.

In order that such a demand is satisfied by the conventional technique, as shown in FIG. 17a, lug grooves 14 are formed in each of half regions in widthwise direction of a tread portion 12 of a tire 10 at a shifting of about half pitch in the circumferential direction. Further, a part of the lug groove 14 substantially extending from a shoulder portion 16 toward a central region of the tread portion 12 in the widthwise direction is bent toward the circumferential direction of the tire. Then, the lug grooves 14, 14 formed in the respective half regions of the tread portion 12 are connected to each other through a subsidiary groove 18 slanting and crossed with respect to the equator P of the tire. The bent portions of the two lug grooves 14 formed in each half region of the tread portion and separated from each other in the circumferential direction of the tire are connected to each other through another subsidiary groove 20 slanting and crossed with respect to a plane separated in parallel to the equatorial plane of the tire consequently an island portion 22 is defined by these subsidiary grooves 18 and 20.

In such a conventional tire 10, the edge of the island portion 22 slants and is crossed with the equatorial plane or the plane separated in parallel to the equatorial plane, so that not only the traction performance and braking performance are improved but also the lateral slipping of the tire against the movement in the widthwise direction of the tire is suppressed to contribute the improvement of the steering property and stability of the tire. Furthermore, when the tire is run on a wet road surface, the above edge develops a so-called edge effect that the edge cuts a water film formed on the road surface to contact with the road surface, so that the wet performances are improved.

As shown in FIG. 17b, the depths of the subsidiary grooves 18 and 20 from the tread surface are about 30% of the depth of the lug groove 14 to ensure the rigidity of the island portion 22 defined by these subsidiary grooves 18 and 20 at the kicking-out side edge. Thus the uneven wear at the kicking-out side region of the island portion 22 during the running of the tire is prevented.

However, the depths of the subsidiary grooves 18 and 20 formed in the central region of the tread portion 12 are shallower than that of the lug groove 14, so that the drainage performance of the tire is degraded as the wearing of the tread surface promotes during the running and hence the given object can not be achieved.

Furthermore, once wear is caused at the edge of the island portion 22 in the central region of the tire tread, the uneven wear gradually proceeds due to the difference in the size of the tire, and also the edge is worn, so that the edge effect can not be expected and consequently the steering property and stability on wet road surface are degraded.

SUMMARY OF THE INVENTION

Under the above circumstances, it is an object of the invention to provide a novel pneumatic tire capable of developing the wet performance without damaging the resistance to uneven wear and the resistance to stone biting in the tire.

In order to achieve the above object, in the pneumatic tire according to the invention, an auxiliary groove connecting at least two lug grooves located in each half region of a tread portion and separated from each other in the circumferential direction of the tire to each other is formed in a central region of the tread portion within a range of about 50% of a tread width. A step protrusion extending along the auxiliary groove is arranged at least inside the auxiliary groove, and groove width $W_1$ of the auxiliary groove, groove depth $d_1$ from tread surface, width $W_2$ of step protrusion surface and height $d_2$ from the bottom of auxiliary groove to the surface of step protrusion satisfy relationships of $(W_1-W_2)/2W_1 < 0.2$ and $0.70 < d_2/d_1 < 0.95$.

In a preferred embodiment of the invention, at least an end of the step protrusion protrudes in the lug groove to satisfy a relationship of $0 < a_1/a_2 < 1$ (wherein $a_1$ is a protruding length of the step protrusion into the lug groove and $a_2$ is a width of the lug groove). In addition to the auxiliary groove, the respective lug grooves located at both half regions of the tread portion are further connected to each other through a slant groove crossed with the equator of the tire. In this case, the slant groove is also provided with a step protrusion having the same structure as in the auxiliary groove.

In another preferred embodiment of the invention, the protruding portions of the step protrusions each protruding into the adjoining lug groove in the circumferential direction are integrally united with each other along the lug groove to continuously extend zigzag in the circumferential direction, and also it is preferable to satisfy a relationship of $90° \leq \alpha, \beta \leq 160°$ (wherein $\alpha$ is an angle between the upper surface of the step protrusion and the protruding end face of the protruding portion and $\beta$ is an angle between the upper surface of the step protrusion and the side face of the protruding portion).

Moreover, it is advantageous that the side wall of the auxiliary groove and/or step protrusion is comprised of a rising segment standing up substantially perpendicular to the bottom of the auxiliary groove and a beveled slant segment crossing with the rising segment and connecting to the surface of the tread portion or the step protrusion.

BRIEF DESCRIPTION OF THE DRAWINGS

The invention will be described with reference to the accompanying drawings, wherein:

FIG. 1a is a schematic view of a first embodiment of the tread pattern in the tire according to the invention;

FIG. 1b is a schematically sectional view of an auxiliary groove in the tread pattern of FIG. 1a;

FIG. 3a is a schematic view of a second embodiment of the tread pattern in the tire according to the invention;

FIG. 3b is a schematically sectional view of an auxiliary groove in the tread pattern of FIG. 3a;

FIGS. 4 to 9 are schematic views of third to eighth embodiments of the tread pattern in the tire according to the invention, respectively;

FIG. 11a is a schematic view of a ninth embodiment of the tread pattern in the tire according to the invention;

FIG. 11b is a schematically sectional view of an auxiliary groove in the tread pattern of FIG. 11a;

FIG. 12 is a schematically sectional view of another embodiment of the auxiliary groove according to the invention;

FIGS. 13a to 13d are graphs showing relations of beveled shapes of auxiliary groove and step protrusion to the tread chipping and the resistance to uneven wear, respectively;

FIGS. 14a, 14b and 15a to 15c are schematically sectional views of beveled shapes of the auxiliary groove and step protrusion according to the invention, respectively;

FIGS. 16a to 16c are graphs showing the comparison between the tire according to the invention and the conventional tire to the wet performance, resistance to uneven wear and resistance to stone biting, respectively;

FIG. 17a is a schematic view of the tread pattern in the conventional tire; and

FIG. 17b is a schematically sectional view of a part of the tire shown in FIG. 17a.

DESCRIPTION OF THE PREFERRED EMBODIMENTS

Figure 2A:
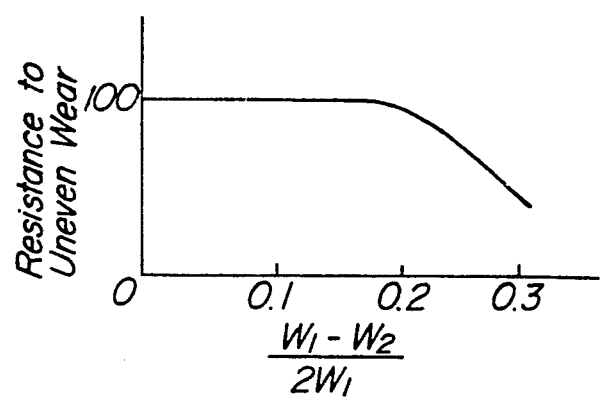
FIGS. 2a and 2b are graphs showing relations of shapes of auxiliary groove and step protrusion to the resistance to uneven wear, respectively.

When the tire according to the invention is run on a road under a load, the tread portion and hence the step protrusion and island portion comes into contact with ground, so that the shearing force is caused at the kicking-out sides of the step protrusion and island portion in a direction opposite to the rotating direction of the tire.

However, it is considered that the shearing force produced in unit area of the tread portion is approximately constant during the rotation of the tire, while the upper surface of the step protrusion drags against road surface because the length of the upper surface of the step protrusion in the circumferential direction of the tire is shorter than that of the tread surface. As a result, a larger shearing force is produced at the step protrusion in a direction opposite to the rotating direction of the tire and the shearing force produced in the island portion becomes smaller.

Consequently, the step protrusion formed on the tread surface is worn instead of the island portion, whereby the progress of wearing at the island portion, particularly its edge can effectively be suppressed, so that the tread surface can wear approximately uniformly.

Since the edge of the island portion is not unevenly worn, even when the wearing of the tread surface proceeds, the sufficient edge effect can be maintained, whereby the steering property and stability on wet road surface are ensured.

Furthermore, when the slant groove is arranged to connect the respective lug grooves located in both half regions of the tread portion to each other and provided with the step protrusion in addition to the auxiliary groove, the rigidity of the step protrusion in the circumferential direction of the tire is improved as compared with the case of using only the auxiliary groove, so that the free deformation of the step protrusion is more restrained in the contacting of the tire with ground. As a result, the shearing force produced in the step protrusion in a direction opposite to the rotating direction of the tire is increased, while the shearing force produced in the island portion is made smaller, whereby the resistance to uneven wear can be more improved.

In the latter case, the step protrusion is arranged inside each of the auxiliary groove and the slant groove, so that the drainage performance is somewhat degraded. However, the edge component of the island portion is increased owing to the presence of the auxiliary groove and slant groove, so that the wet performances are not damaged.

On the other hand, at least an end, preferably both ends of the step protrusion arranged inside the auxiliary groove therealong protrudes into the respective lug groove, whereby the rigidity of the step protrusion in the circumferential direction of the tire can be more enhanced. Of course, the rigidity of the step protrusion in the circumferential direction of the tire is further enhanced by integrally uniting the portions of the step protrusions protruding into the lug grooves with each other along the lug grooves. This can also be accomplished by selecting the angle $\alpha$ between the upper surface of the step protrusion and the protruding end face of the step protrusion and the angle $\beta$ between the upper surface of the step protrusion and the side face of the protruding portion so as to satisfy the relationship of $90° \leq \alpha, \beta \leq 160°$. As a result the uneven wear of the island portion can be suppressed and the wet performance of the tire can be improved.

Moreover, when the side wall of the auxiliary groove and/or the step protrusion is comprised of a rising segment substantially vertically standing up from the bottom of the auxiliary groove and a beveled segment extending from the rising segment and slantly crossing with the tread surface, the problem of stone biting resulted from the formation of the step protrusion inside the auxiliary groove and/or the lug groove can be advantageously solved.

In FIG. 1a is shown a first embodiment of the heavy duty pneumatic tire according to the invention. This tire 30 has a so-called lug pattern, in which lug grooves 34 are arranged in each half region of a tread portion 32 in the widthwise direction of the tire and in substantially symmetry with each other in both half regions with respect to an equator P of the tire and separated away from each other in the circumferential direction. Slant grooves 36 each cross with the equator P and are arranged so as to connect ends of the respective lug grooves 34 located in both half regions of the tread portion to each other. Auxiliary grooves 38 are arranged to connect an end of lug groove 34 located in one half region of the tread portion to a middle of the adjoining another lug groove 34 located at the same half region of the tread portion and separated from the above lug groove in the circumferential direction of the tire. Island portions 40 are defined by these lug grooves 34, slant grooves 36 and auxiliary grooves 38. The internal structure of the tire is a general radial structure. Moreover, a half portion of the lug groove 34 is slantly extended with respect to the equator P in the half region of the tread portion and the other half portion is extended outward in the widthwise direction of the tire and opened to a shoulder portion 42.

The slant groove 36 and auxiliary groove 38 contribute to the improvement of the drainage performance in the tire, while the edge of the island portion 40 defined by the slant groove 36 and the auxiliary groove 38 or an edge line slantly extending with respect to the equator P regulates the movement of the tire in the widthwise direction thereof as previously mentioned. In the illustrated embodiment, the depth of each of the auxiliary groove and the slant groove is substantially equal to that of the lug groove 34.

According to the invention, as shown in FIG. 1b by a section taken along a line A—A, a step protrusion 44 is formed inside the auxiliary groove 38, which connects the adjoining lug grooves 34 separated in each half region of the tread portion 32 in the circumferential direction of the tire to each other, along the auxiliary groove 38. The upper surface of the step protrusion 44 is located inward from the upper surface of the tread portion 32 in the radial direction thereof. Thus level different portions extending along the auxiliary grooves 38 are formed on the upper surface of the tread portion 32.

The reason why the step protrusion 44 is formed along the auxiliary groove 38 is due to the fact that the step protrusion 44 is positively worn instead of the island portion 40, particularly the edge thereof during the rotation of the tire under loading and hence the tire is substantially uniformly worn over its whole to still ensure the edge effect at the edge of the island portion 40 even in the worn tire.

Furthermore, when the width of the auxiliary groove 34 is $W_1$, the depth from the surface of the tread portion 32 to the bottom of the auxiliary groove 38 is $d_1$, the width of upper surface of the step protrusion 44 is $W_2$ and the height from the upper surface of the step protrusion 44 to the bottom of the auxiliary groove 38 is $d_2$. They are selected so as to satisfy the following inequalities (1) and (2):

$$(W_1 - W_2)/2W_1 < 0.2 \qquad (1)$$

$$0.70 < d_2/d_1 < 0.95 \qquad (2)$$

The reason why the Width $W_1$ of the auxiliary groove 38 and the width $W_2$ of the upper surface of the step protrusion 44 are selected to satisfy the inequality (1) is due to the fact that when a half value of a ratio of difference between width $W_1$ of the auxiliary groove 38 and width $W_2$ of the upper surface of the step protrusion 44 to width $W_1$ of the auxiliary groove 38 or $(W_1 - W_2)/2W_1$ exceeds 0.2, the resistance to uneven wear is degraded as shown in FIG. 2a.

Figure 2B:
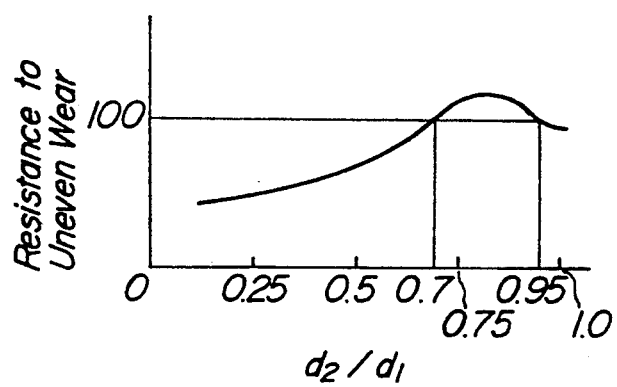

Furthermore, the reason why the depth $d_1$ from the surface of the tread portion 32 to the bottom of the auxiliary groove 38 and the height $d_2$ from the upper surface of the step protrusion 44 to the bottom of the auxiliary groove 38 are selected to satisfy the inequality (2) is due to the fact that when the ratio of height $d_2$ of step protrusion to depth $d_1$ of auxiliary groove is less than 0.75 and more than 0.95, the resistance to uneven wear in the tire is degraded as shown in FIG. 2b.

Moreover, the tire showing a resistance to uneven wear of 100 in FIGS. 2a and 2b is the conventional tire having a tread pattern shown in FIG. 17.

According to the invention, the auxiliary groove 38 including the step protrusion 44 therein is arranged in a central region of the tire tread portion 32 within a range of approximately 50% of tread width inclusive of the equator P because the uneven wear is particularly apt to be caused in such a central region of the tread portion. Moreover, it is preferable that the step protrusion 44 has a length of not less than 30 mm and a surface width $W_2$ of not less than 10 mm for providing the rigidity durable to the deformation of the tire.

In FIG. 3a illustrates a second embodiment of the tire according to the invention. Concretely, the invention is applied to the conventional tire shown in FIG. 17.

In the tire 50 of this embodiment, at least two adjoining lug grooves 14 located at each half region of the tread portion 12 are connected to each other through each of auxiliary grooves 38a slantly crossing with the equator P and arranged in each half region of the tread portion and shifted at a half pitch in the circumferential direction of the tire. Thus, the end of one of the two lug grooves toward the center of the tread portion is connected to a middle of the other adjoining lug groove. The ends of the respective lug grooves arranged in both half regions of the tread portion and shifted at a half pitch in the circumferential direction are connected to each other through a slant groove 38b slantly crossing with the equator P, and step protrusions 44 are formed in each of these auxiliary grooves 38a and the slant grooves 38b. In this case, the depths $d_1$ of the auxiliary groove 38a and the slant groove 38b are equal to the depth of the lug groove 14. For convenience' sake, the same portion of the tire as in FIG. 17 is indicated by the same numeral as in FIG. 17.

Moreover, FIG. 3b shows a section of the auxiliary groove 38a and slant groove 38b taken along lines B—B and C—C in FIG. 3a. It is a matter of course that the width $W_1$ and depth $d_1$ of each of the auxiliary groove 38a and slant groove 38b and the width $W_2$ and height $d_2$ of the step protrusion 44 satisfy the above inequalities (1) and (2).

FIG. 4 illustrates a third embodiment of the tire according to the invention. That is, the tire 52 is a modified embodiment of the tire shown in FIG. 1a, in which at least an end of the step protrusion 44 is protruded into the lug groove 34. In the illustrated embodiment, both end portions of the step protrusion 44 protrude into the respective lug grooves 34. Preferably, the length $a_1$ of the protruding portion 44a of the step protrusion 44 into the lug groove 34 and the width $a_2$ of the lug groove 34 including the protruding portion satisfy a relation of $0 < a_1/a_2 < 1$.

In the tire 52 wherein at least an end of the step protrusion 44 protrudes into the lug groove 34, not only the rigidity of the step protrusion inclusive of the protruding portion is enhanced in the circumferential direction of the tire but also the length and hence the volume of the step protrusion is increased. Thus the load acting to the unit volume of the step protrusion during the running of the tire can be reduced. Therefore, when the tread of the tire 52 comes into contact with ground, the movement of the step protrusion 44 can be controlled to further concentrate the shearing force produced in a direction opposite to the rotating direction of the tire into the step protrusion 44, so that the uneven wear at the island portion 40, particularly the edge thereof defined by the lug groove and the auxiliary groove can be further reduced.

Moreover, it is confirmed from experiments that the reason why the length $a_1$ of the protruding portion of the step protrusion 44 and the width $a_2$ of the lug groove 34 including this protruding portion must satisfy the relation of $0<a_1/a_2<1$ is due to the fact that when $a_1/a_2=0$ is standard, the resistance to uneven wear is improved as the value of $a_1/a_2$ becomes large and is a maximum at $a_1/a_2 \approx 0.8$ and lowers to the level of $a_1/a_2=0$ in case of $a_1/a_2=1$.

Figure 5:
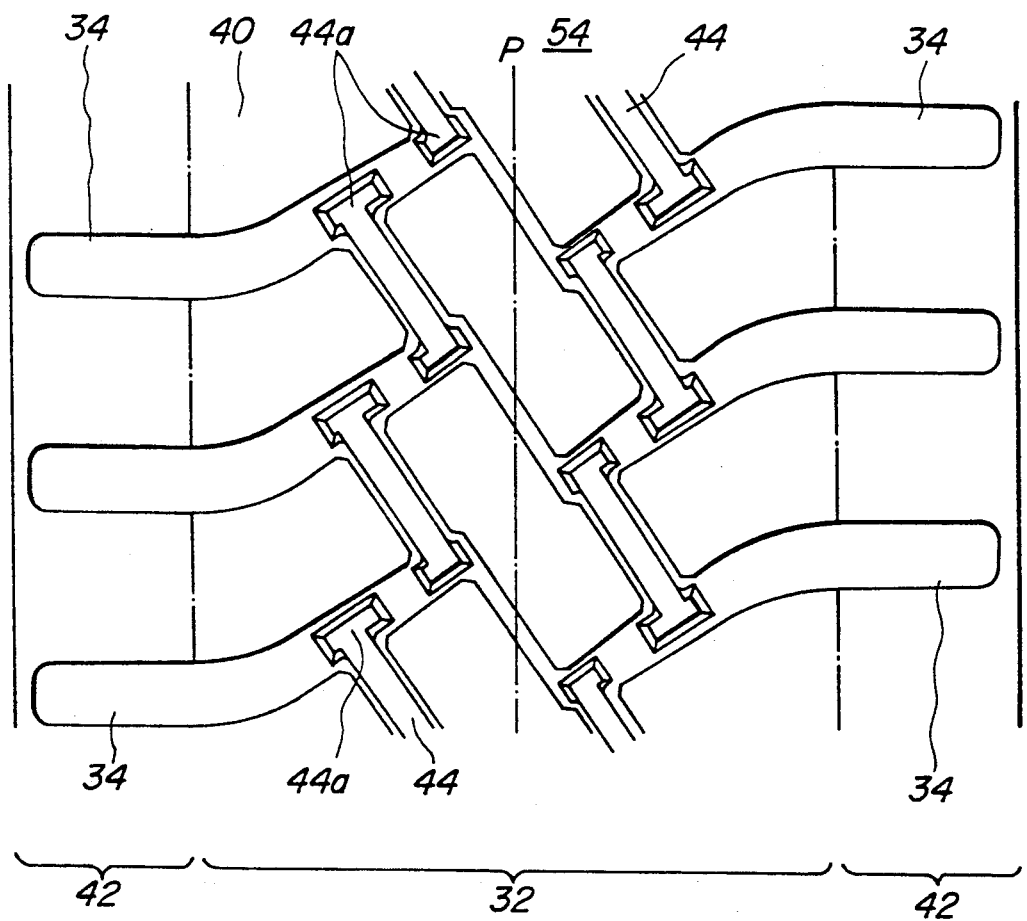

Of course, the step protrusion may protrudes at a width approximately equal to that of the auxiliary groove 38. Further, the protruding portion 44a of the step protrusion 44 may be extended in the lug groove 34 therealong as shown in FIG. 5 showing a fourth embodiment of the tire according to the invention. In the latter tire 54, the rigidity in circumferential direction and the volume of the step protrusion 44 can further be increased to further improve the resistance to uneven wear.

Figure 6:
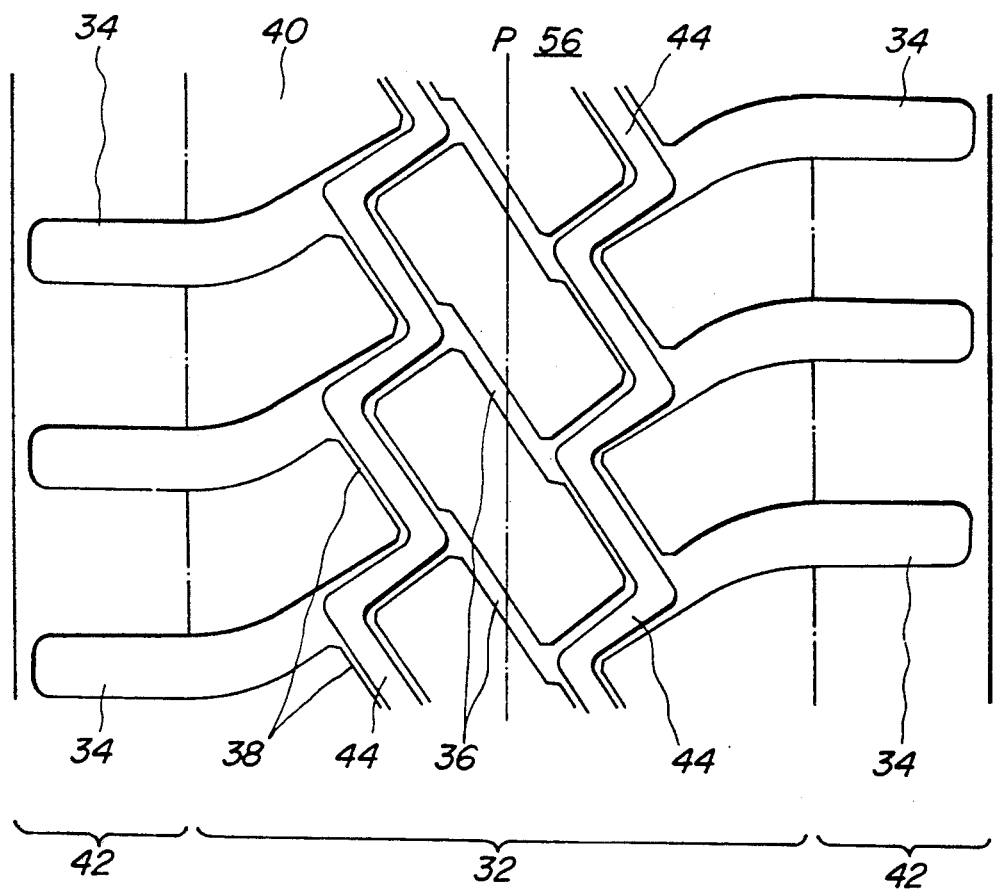

FIG. 6 illustrates a fifth embodiment of the tire according to the invention. In this tire 56, the protruding portion of the step protrusion 44 protruded into the lug groove 34 is extended inward in the widthwise direction of the tire along the lug groove 34 and integrally united with the protruding portion of the other step protrusion protruded into this lug groove 34 in each half region of the tread portion 32. That is, the step protrusion 44 is continuously extended zigzag in the circumferential direction of the tire along the auxiliary groove 38 and the lug groove 34. Even in such a tire 56, the resistance to uneven wear can further be improved due to the increase of the rigidity and volume of the step protrusion 44 in the circumferential direction of the tire.

Figure 7:
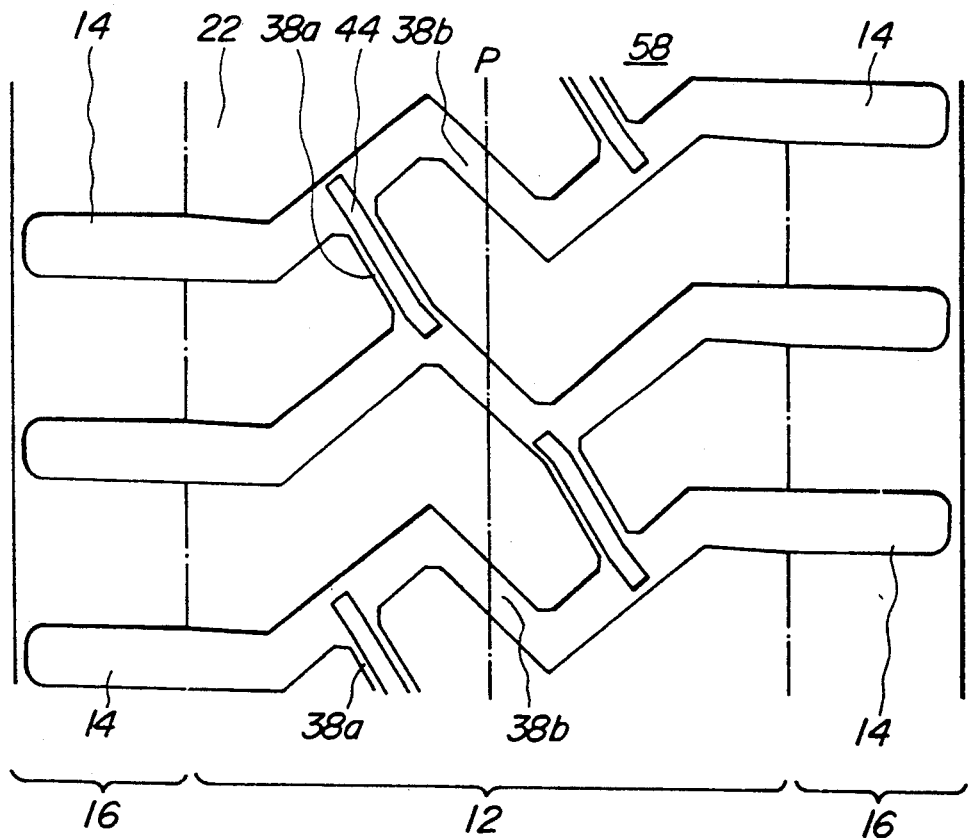
Figure 8:
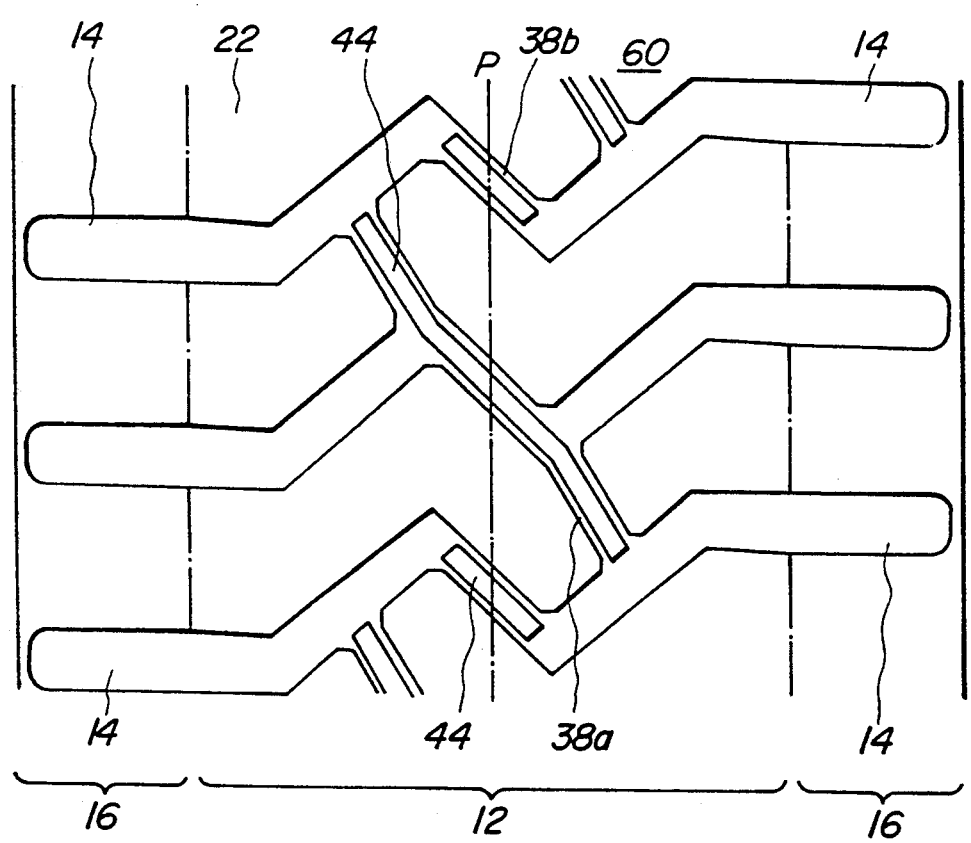
Figure 9:
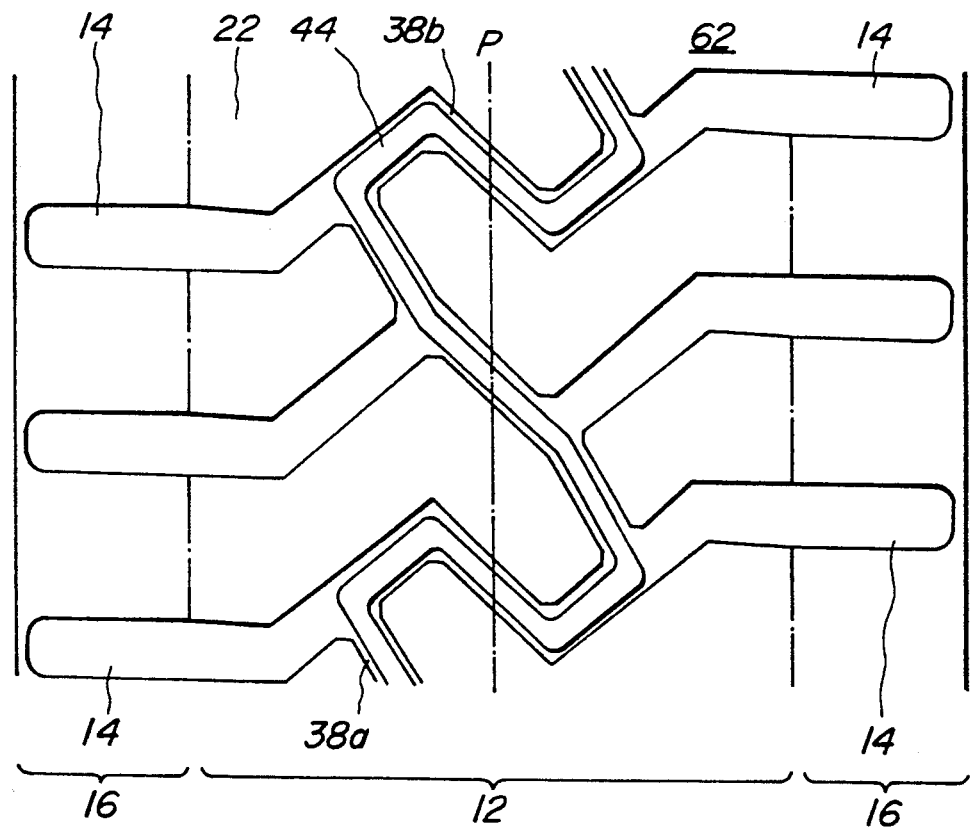

FIGS. 7 to 9 illustrate sixth to eighth embodiments of the tire according to the invention. These tires are modified embodiments of the tire shown in FIG. 3a, respectively. In this case, the same portion of the tire as in FIGS. 3a and 17 is indicated by the same numeral as in FIGS. 3a and 17.

The tire 58 of FIG. 7 is different from the tire 50 of FIG. 3 in that both end portions of the step protrusion 44 are protruded from the auxiliary groove 38a into the lug grooves 14, respectively, but the step protrusion 44 is not existent in the slant groove 38b.

The tire 60 of FIG. 8 is different from the tire 50 of FIG. 3 in that the step protrusion 44 formed in the slant groove 38b is protruded at both ends toward the auxiliary grooves 38a every other slant groove including the step protrusion therein and integrally united with the step protrusions formed in the auxiliary grooves 38a.

The tire 62 of FIG. 9 is different from the tire 50 of FIG. 3 in that the step protrusions 44 formed in the auxiliary grooves 38a and the slant grooves 38b are integrally united with each other along the auxiliary groove 38a, slant groove 38b and lug groove 14 to continuously extend zigzag in the circumferential direction of the tire.

In any of the embodiments of FIGS. 7 to 9, it is a matter of course that the resistance to uneven wear can be more improved owing to the more increase of the rigidity and volume of the step protrusion 44 in the circumferential direction of the tire. Moreover, since the step protrusions are arranged in the auxiliary groove, slant groove and/or lug groove, the drainage performance is degraded due to the existence of the step protrusion in these grooves. However, the edge components at the tread surface inclusive of the step protrusion against the road surface are increased, so that the degradation of the drainage performance is compensated by the edge effect of these edge components and the improvement o wet performance can be expected.

Figure 10A:
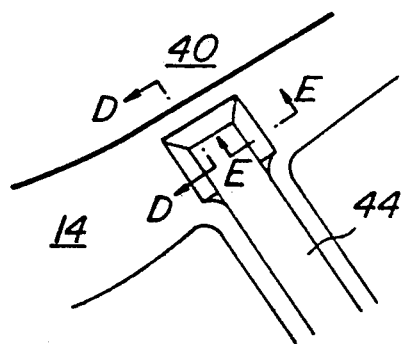
FIG. 10a is a schematic view of the step protrusion according to the invention.
Figure 10B:
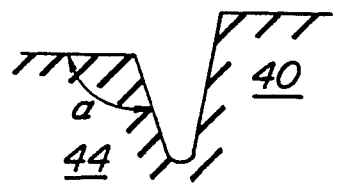
FIGS. 10b and 10c are schematically sectional views taken along lines D—D and E—E of FIG. 10a, respectively.
Figure 10C:
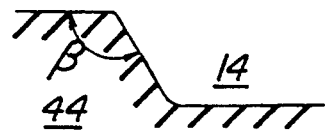

In the above embodiments, it is favorable that an angle $\alpha$ between the upper surface of the step protrusion 44 and the protruding end face of the step protrusion into the lug groove and an angle $\beta$ between the upper surface of the step protrusion and the side face of the protruding portion (see FIGS. 10a to 10c) are selected to satisfy a relation of $90° \leq \alpha, \beta \leq 160°$.

The reason why the angles $\alpha$, $\beta$ are selected from the above range is due to the fact that the rigidity of the protruding portion of the step protrusion is enhanced to control the movement of the step protrusion as a whole, whereby a percentage of shearing force acting to the step protrusion at the tread surface in a direction opposite to the rotating of the tire during the running of the tire is increased and a percentage of the shearing force acting to the island portion is decreased to control the occurrence of uneven wear. When the angles $\alpha$, $\beta$ are less than 90°, the protruding portion of the step protrusion and hence the step protrusion itself are apt to be deformed. Consequently the percentage of the shearing force acting to the island portion is increased to cause uneven wear at the island portion, particularly the edge thereof.

When the angles $\alpha$, $\beta$ are larger than 160°, the drainage performance of the lug groove portion located at the shoulder portion is degraded to degrade the wet performances.

As mentioned above, the resistance to uneven wear and the wet performances can be improved by arranging the step protrusions along the auxiliary groove, slant groove and/or lug groove. This is anticipated to cause problems of stone biting between the step protrusion and the auxiliary groove, slant groove or lug groove and of tread chipping due to this stone biting.

In order to solve these problems, in a tire 63 of a ninth embodiment shown in FIG. 11a, the step protrusion 44 formed in the auxiliary groove 38 is comprised of a rising segment 44b standing up in a direction substantially perpendicular to the bottom of the auxiliary groove 38 and a beveled segment 44c extending from the rising segment 44b and slantly crossing with the upper surface of the step protrusion 44. FIG. 11b illustrates this embodiment in a section taken along a line F—F of FIG. 11a.

In this case, when the width of the beveled segment 44c is $W_3$, the depth of the beveled segment 44c from the upper surface of the step protrusion is $d_3$, the width of the step protrusion 44 is $W_2$ and the height of the step protrusion 44 from the groove bottom is $d_2$, they are selected to satisfy the following inequalities (3) and (4), preferably the following inequalities (3') and (4')':

$$0.2 \leq d_3/d_2 \leq 0.8 \tag{3}$$

$$0.1 \leq W_3/W_2 \leq 0.8 \tag{4}$$

$$0.4 \leq d_3/d_2 \leq 0.6 \tag{3'}$$

$$0.4 \leq W_3/W_2 \leq 0.6 \tag{4'}$$

When the ratio $d_3/d_2$ is more than 0.8 or the ratio $W_3/W_2$ is less than 0.1, the rigidity of the step protrusion is lowered to degrade the resistance to uneven wear. When the ratio $d_3/d_2$ is less than 0.2 or the ratio $W_3/W_2$ is more than 0.8, the resistance to stone biting is not improved.

On the other hand, as shown in FIG. 12, the beveled segment 38c may be formed in the side wall of the auxiliary groove 38 instead of the beveled segment 44c. In this case, when the width of the beveled segment 38c is $W_4$ and the depth of the beveled segment 38c from the tread surface is $d_4$, they are selected to satisfy the following inequalities (5) and (6), preferably the following inequalities (5') and (6'):

$$0.1 \leq d_4/d_1 \leq 0.7 \tag{5}$$

$$0.05 \leq W_4/W_1 \leq 0.5 \tag{6}$$

$$0.1 \leq d_4/d_1 \leq 0.7 \tag{5'}$$

$$0.05 \leq W_4/W_1 \leq 0.3 \tag{6'}$$

As shown in FIGS. 13a and 13b, when the ratio $d_4/d_1$ is not less than 0.1 and the ratio $W_4/W_1$ is not less than 0.05, the effect of preventing tread chipping due to the stone biting is improved.

On the other hand, as shown in FIGS. 13c and 13d, when the ratio $d_4/d_1$ is more than 0.7 and the ratio $W_4/W_1$ is more than 0.5, the resistance to uneven wear is degraded.

Therefore, when each of the ratios $d_4/d_1$ and $W_4/W_1$ is within the above range, the side face of the auxiliary groove 38 may have a sectional shape as shown in FIGS. 14a and 14b.

Furthermore, according to the invention, each of the side walls of the auxiliary groove 38 and the step protrusion 44 may be provided with the beveled segments 38c and 44c as shown by section in FIGS. 15a to 15c. In any case, when the step protrusion and/or the auxiliary groove are provided at the side wall with the beveled segment, the widths $W_3$ and $W_4$ and the depths $d_3$ and $d_4$ are selected to satisfy the above inequalities (3) to (6).

The following example is given in illustration of the invention and is not intended as limitation thereof.

EXAMPLE

In order to examine the wet performance, resistance to uneven wear and resistance to stone biting of the tire, the comparative test is made by using the invention tires having the step protrusion in the auxiliary groove and the conventional tire having no step protrusion to obtain results as shown in FIGS. 16a to 16c. Moreover, all of the tires have a radial structure and a tire size of 10.00 R20.

Test Tire

Invention tire 1

This tire has a tread pattern shown in FIG. 1, wherein the tread width is 204 mm, the maximum and minimum widths of the lug groove are 20 mm (shoulder portion) −12 mm (central region), the maximum and minimum depths of the lug groove are 20.5 mm (shoulder portion) −15.4 mm (central region), the interval between lug groove in circumferential direction is 66 mm, the width ($W_1$) of the auxiliary groove is 15 mm, the depth ($d_1$) of the auxiliary groove is 16 mm, the width ($W_2$) of the step protrusion is 13 mm, the height ($d_2$) of the step protrusion is 14 mm, the length of the step protrusion is 40 mm, the width of the slant groove 6 mm and the depth of the slant groove 9 mm.

Invention tire 2

This tire has a tread pattern shown in FIG. 4, wherein the dimensions are equal to those of the invention tire 1 except that the protruding length $a_1$ of the step protrusion is 20 mm, and the angles $\alpha$, $\beta$ are 115° and 130°, respectively.

Invention tire 3

This tire has a tread pattern shown in FIG. 6, wherein the step protrusion is continuously extended zigzag in the circumferential direction of the tire and the other dimensions are equal to those of the invention tire 1.

Invention tire 4

This tire has the same tread pattern and dimensions as in the invention tire 1 except that the auxiliary groove has a sectional shape shown in FIG. 12 and the width ($W_4$) and depth ($d_4$) of the beveled segment are 7 mm and 5 mm, respectively.

Conventional tire

This tire has a tread pattern shown in FIG. 17 containing no step protrusion in the auxiliary groove.

Test Method

Wet performance

Each of the test tires is mounted on a vehicle at various states ranging from a new state to a sufficiently worn state and subjected to a turning test on a constant circle at a water depth of 5 mm, during which a lateral acceleration speed is measured. The measured value is evaluated by an index. The larger the index value, the better the wet performance.

Resistance to uneven wear

Each of the test tires is assembled into a normal rim, mounted onto a vehicle under normal internal pressure and a normal load, and run over a distance of 30,000 km. Thereafter, the wear amount at the tread surface is measured. The measured value is evaluated by an index. The larger the index value, the better the resistance to uneven wear.

Resistance to stone biting

Each of the test tires is assembled into a normal rim, mounted onto a vehicle under a normal internal pressure and a normal load, and run on rough road over a distance of 5,000 km. Thereafter, the number of stones bitten in grooves is measured. The smaller the stone number, the better the resistance to stone biting.

Moreover, the test results are shown in FIGS. 16a to 16c.

As seen from FIGS. 16a to 16c, the wet performance rapidly lowers in the conventional tire as the wearing proceeds to a certain extent, while the tires according to the invention can develop the sufficient wet performance even at a fairly worn state. Furthermore, when the tires according to the invention are compared with the conventional tire, the occurrence of uneven wear can be controlled and also the resistance to stone biting can sufficiently be compensated though the step protrusion is arranged in the auxiliary groove.

As mentioned above, according to the invention, heavy duty pneumatic tires having improved wet performances and causing no degradation of wet performances even at a worn state can be provided without damaging the resistance to uneven wear and resistance to stone biting in the tire.

We claim:

1. A heavy duty pneumatic tire comprising; lug grooves formed in each half region of a tread portion and separated from each other at a given interval in a circumferential direction of the tire, island portions defined by said lug grooves, an auxiliary groove connecting at least two lug grooves located in said half region of the tread portion and separated from each other in the circumferential direction of the tire to each other, said auxiliary grooves formed in a central region of the tread portion within a range of about 50% of a tread width, a step protrusion extending along the auxiliary groove and arranged at least inside the auxiliary groove, and a grove width $W_1$ of the auxiliary groove, a groove depth $d_1$ of the auxiliary groove from tread surface, a width $W_2$ of a surface of the step protrusion and a height $d_2$ from the bottom of the auxiliary groove to the surface of the step protrusion satisfy relationship of $(W_1-W_2)/2W_1<0.2$ and $0.70<d_2/d_1<0.95$, and said step protrusion has a length of not less than 30 mm and a width $W_2$ of not less than 10 mm.

2. The heavy duty pneumatic tire according to claim 1, wherein said lug groove arranged in one half region of the tread portion is connected to said lug groove arranged in the other half region of the tread portion through a slant groove slanting and crossing with an equator of the tire.

3. The heavy duty pneumatic tire according to claim 2, wherein said slant groove is provided with a step protrusion.

4. The heavy duty pneumatic tire according to any one of claim 1-3, wherein at least an end of said step protrusion is protruded in said lug groove so as to satisfy a relationship of $0<a_1/a_2<1$ (wherein $a_1$ is a protruding length of the step protrusion into the lug groove and $a_2$ is a width of the lug groove).

5. The heavy duty pneumatic tire according to claim 1 or 2, wherein said step protrusion protrudes from said auxiliary groove into said lug groove and is extended along said lug groove and integrally united with a step protrusion in a second auxiliary groove to continuously extend zig-zag in the circumferential direction of the tire.

6. The heavy duty pneumatic tire according to claim 3, wherein said step protrusion in every other one of slant grooves is extended at both ends of said slant groove and is integrally united with said step protrusions formed in said auxiliary grooves.

7. The heavy duty pneumatic tire according to claim 3, wherein step protrusion in alternating ones of said slant grooves are extended at both ends and integrally united with said step protrusions formed in said immediately adjacent auxiliary grooves to form a united step protrusion that is extended at both ends along said step protrusions to continuously extend zigzag in the circumferential direction of the tire.

8. The heavy duty pneumatic tire according to claim 4, wherein a portion of said step protrusion protruding into said lug groove satisfies a relationship of $90°\leq \alpha,\beta \leq 160°$, wherein $\alpha$ is an angle between the upper surface of the step protrusion and the protruding end face of the protruding portion and $\beta$ is an angle between the upper surface of the step protrusion and the side face of the protruding portion.

9. The heavy duty pneumatic tire according to any one of claims 1 to 3, wherein a side wall of at least one of said auxiliary groove and step protrusion is comprised of a rising segment standing up substantially in perpendicular to the bottom of the auxiliary groove and a beveled segment slanting and crossing with the rising segment and connecting to the surface of the tread portion or the step protrusion.

* * * * *